United States Patent
Lewalle

(10) Patent No.: US 9,423,490 B2
(45) Date of Patent: Aug. 23, 2016

(54) SPATIAL LOCALIZATION OF INTERMITTENT NOISE SOURCES BY ACOUSTIC ANTENNAE

(71) Applicant: Jacques Lewalle, Syracuse, NY (US)

(72) Inventor: Jacques Lewalle, Syracuse, NY (US)

(73) Assignee: Syracuse University, Syracuse, NY (US)

( * ) Notice: Subject to any disclaimer, the term of this patent is extended or adjusted under 35 U.S.C. 154(b) by 0 days.

(21) Appl. No.: 14/761,788

(22) PCT Filed: Jan. 18, 2014

(86) PCT No.: PCT/US2014/012149
§ 371 (c)(1),
(2) Date: Jul. 17, 2015

(87) PCT Pub. No.: WO2014/113739
PCT Pub. Date: Jul. 24, 2014

(65) Prior Publication Data
US 2015/0362582 A1    Dec. 17, 2015

Related U.S. Application Data

(60) Provisional application No. 61/754,320, filed on Jan. 18, 2013.

(51) Int. Cl.
*G01S 5/30*    (2006.01)
(52) U.S. Cl.
CPC ........................................ *G01S 5/30* (2013.01)
(58) Field of Classification Search
CPC ........................................................ G01S 5/30
See application file for complete search history.

(56) References Cited

U.S. PATENT DOCUMENTS

| 2002/0097885 A1 | 7/2002 | Birchfield et al. |
| 2008/0181056 A1 | 7/2008 | Bernecky |

(Continued)

FOREIGN PATENT DOCUMENTS

JP    11-304906    11/1999

OTHER PUBLICATIONS

Xiaohong Sheng, et al., Maximum likelihood multiple-source localization using acoustic energy measurements with wireless sensor networks. Signal Processing, Jan. 2005, vol. 53 No. 1, pp. 44-53, ISSN 1053-587X. See abstract, pp. 44-46, and figure 2.

(Continued)

*Primary Examiner* — Daniel Pihulic
(74) *Attorney, Agent, or Firm* — Bond Schoeneck and King PLLC; David Nocilly; George McGuire

(57) ABSTRACT

A noise source localization process that uses as few as four microphones in an antenna array. The process combines different averaging to the information from the various signals with non-linear (wavelet-based) filtering, cross-correlation and triangulation to more particularly locate a noise source relative to a target point. The process calculates a propagation time based on the distance from a target to each microphones, delays each of the signals according to the propagation time from the target, calculates a continuous wavelet transform for each of the signals to band-pass filter each of the signals according to a predetermined frequency of interest, determines the product of each pair of signals to produce correlation fringes, and locates the noise source based on the product of the pairs of signals.

10 Claims, 16 Drawing Sheets

(56) References Cited

U.S. PATENT DOCUMENTS

2009/0076815 A1     3/2009   Ichikawa et al.
2015/0362582 A1*   12/2015   Lewalle .................... G01S 5/30
                                                                           367/124

OTHER PUBLICATIONS

International Search Report Form PCT/ISA/220, International Application No. PCT/US14/012149, pp. 1-9, Dated Apr. 25, 2014.

* cited by examiner

US 9,423,490 B2

SPATIAL LOCALIZATION OF INTERMITTENT NOISE SOURCES BY ACOUSTIC ANTENNAE

CROSS-REFERENCE TO RELATED APPLICATIONS

The present application claims priority to U.S. Provisional Application No. 61/754,320, filed on Jan. 18, 2013.

BACKGROUND OF THE INVENTION

1. Field of the Invention

The present invention relates to noise detection and location and, more particularly, to a small array of microphones and associated processing system that can be used to locate intermittent noise/sound sources.

2. Description of the Related Art

Industrial noise is a vexing environmental problem, affecting the workplace as well as public spaces. One of the critical steps to better engineering, through active flow control or other relevant design changes, is the localization of the sources, which can be small, intermittent and jittery. These sources can be a problem in high speed transportation (wind noise in automotive industry) to wind turbine acoustic impact, from machinery noise to household appliances, and from jet noise to many forms of acoustic tomography and related non-invasive diagnostics.

Parabolic antennae are used to focus the sound propagating along one straight line parallel to the parabola's axis into its focal point (single microphone). These systems were known for eavesdropping opportunities near stone or frescoed cupolas in ancient times, and are displayed on the sidelines of modern sports fields. Their electromagnetic siblings are ubiquitous as satellite dishes. However, they are incapable of providing distance information.

Acoustic antennae are combinations of microphones collecting sound from assorted sources, and they provide a measure of spatial localization. Related technology is very efficient in the context of phased-array radars, but the difference in wavelength-dependent resolution is critical at the application level. The signals $p_i(t)$, i=1 ... N (where N is the number of microphones) are collected simultaneously and combined, either in real time or in post-processing mode. When a target is specified, it is a simple matter of Cartesian geometry to calculate the distances $D_i$ between the known microphone locations and the target; these distances are then converted to propagation times $T_i=D_i/c$ for a given ambient speed of sound c. Knowing that acoustic fluctuations from the targeted source reach the microphones at different times, the relative lags (differences in arrival times) $t_{ij}=T_i-T_j$, can be used to synchronize the signals to be in phase with each other. The microphones are typically arranged as a plane non-periodic array, e.g., along the arms of logarithmic spirals.

Existing systems for noise location are based on phased-array antennae and beam forming algorithms. The antennae are (typically flat) arrays of several dozen microphones arranged in irregular patterns. Recording simultaneously from all microphones yields the raw data. The 'focusing' on a given target is achieved by introducing a relative delay between the signals to account for different propagation times from source to microphone; averaging these lagged signals amounts to seeking constructive interference from the target area and partially-cancelling interference for all mismatched lags. The spatial resolution of these antennae is of the order of one wavelength of the acoustic wave—for 1 kHz sound, the 'ball' of localization is over one foot in diameter, whereas possible responsible flow patterns are in the inch range or smaller. So, existing antennae cannot resolve the spatial intermittency and random motion of many source.

BRIEF SUMMARY OF THE INVENTION

The present invention comprises three complementary algorithms. The first algorithm combines signals from only a half-dozen microphones. The first algorithm is not based on classical wave interference, but on pattern recognition, and is therefore distinct from beam forming. The second algorithm processes the information from the few microphones (first algorithm) through a combination of steps such as non-linear (wavelet-based) filtering and cross-correlation. Lag identification by pattern recognition is a cornerstone of the present invention. The third algorithm determines the individual source locations by least-square triangulation based on the measured lags for each event.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
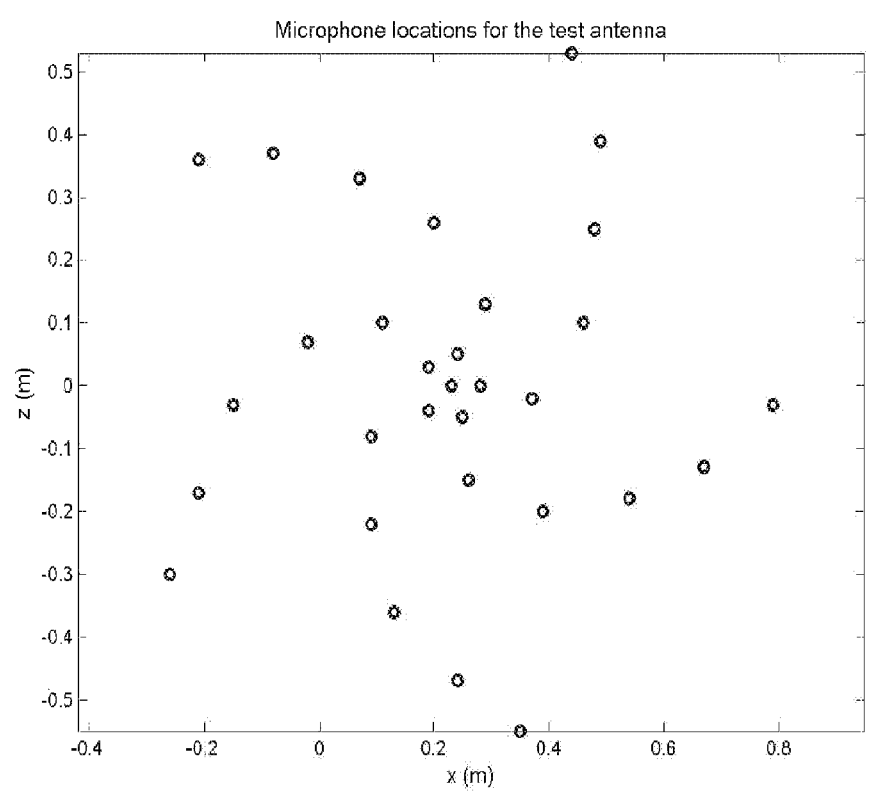
FIG. 1 is a graph of the microphone locations used for the present invention.
Figure 2:
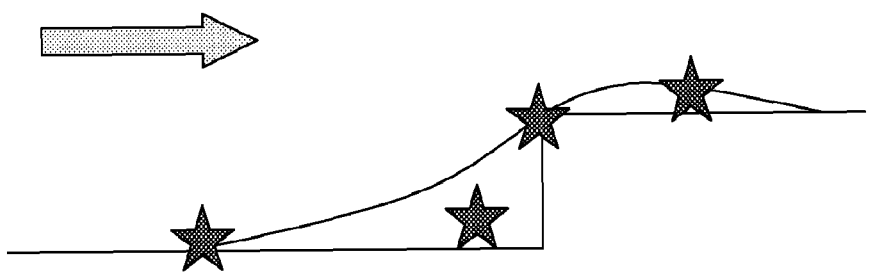
FIG. 2 is a schematic of noise production in an industrial environment.

Referring now to the drawings, wherein like reference numerals refer to like parts throughout, the present invention comprises a method to improve the accuracy of acoustic antennae, illustrating their use for multi-scale (broadband) intermittent (non-periodic) sources. The method of the present invention commences with the collection of acoustic signals, fluctuating in time, from individual microphones. The present invention may be used with only a half-dozen microphones, and does not rely on interference (phase matching or wave interference). Instead, the method employs pattern recognition, thereby using the collected information more thoroughly. It should be recognized by those of skill in the art that the method of the present invention could be performed in combination with a conventional antenna having microphones capable of outputting an acoustic signal that can be sampled by a microcontroller programmed to implement the invention, or in firmware or other digital processing equipment that can be configured to process the acoustic signals according to the present invention.

The method used pair-wise logarithmic averages:

$$\prod_i P_i$$

for the pattern recognition of intermittent sources. Instead of Fourier (frequency-based) representations best suited for periodic and multi-periodic signals, the method of the present invention uses continuous wavelet transforms (time-frequency), which capture the intermittency for further quantitative processing. Lags are adjusted to individual frequency-specific short excerpts and this precise determination of lags is then used to triangulate to the source location. The triangulation includes redundancy through a least-square fit to mitigate the effect of ambient noise and results in an order-of-magnitude improvement in source location.

The time-frequency representation is conducted first by the decomposition of the acoustic signals in the time-frequency domain through the use of continuous wavelet transforms. For illustrative purposes, a short excerpt of a composite signal is used, obtained from the microphone antenna described above, and combined according to the beam forming algorithm into a single time trace.

Figure 3:
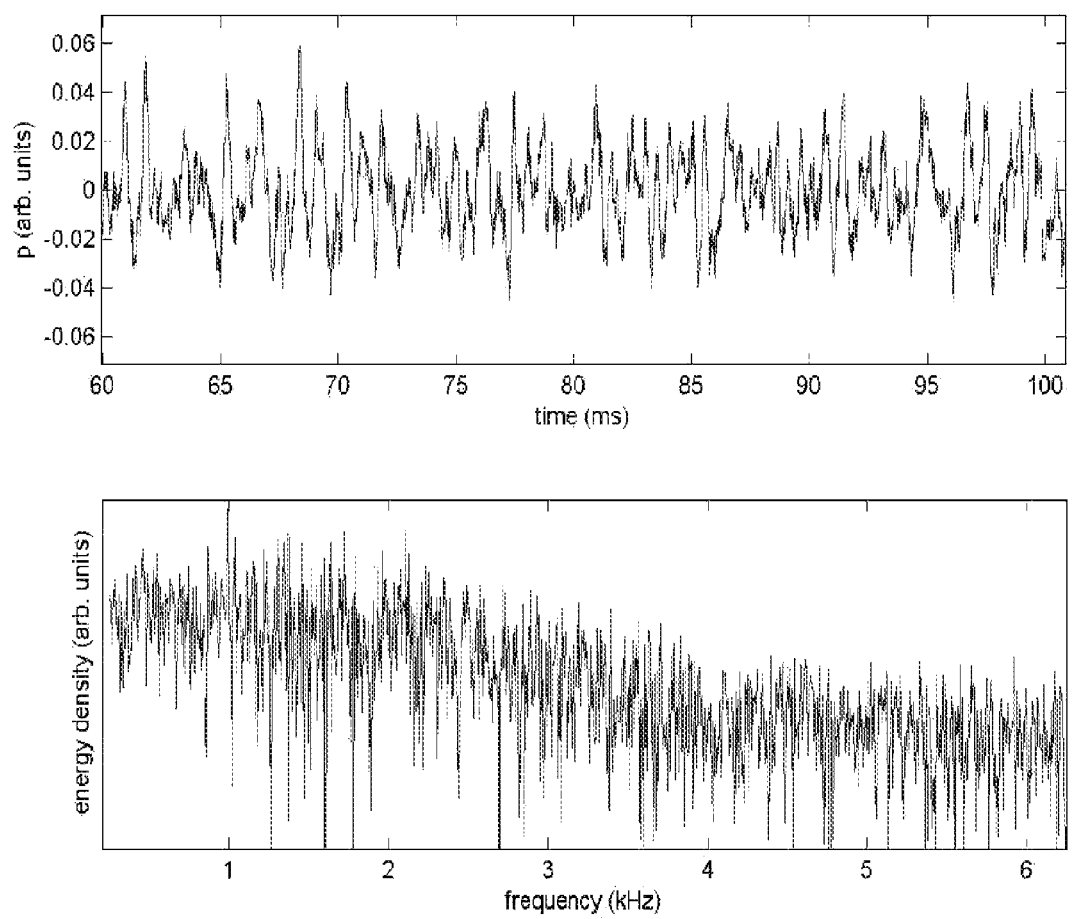
FIG. 3 is a graph of a beam-formed signal and its power spectrum.
Figure 4:
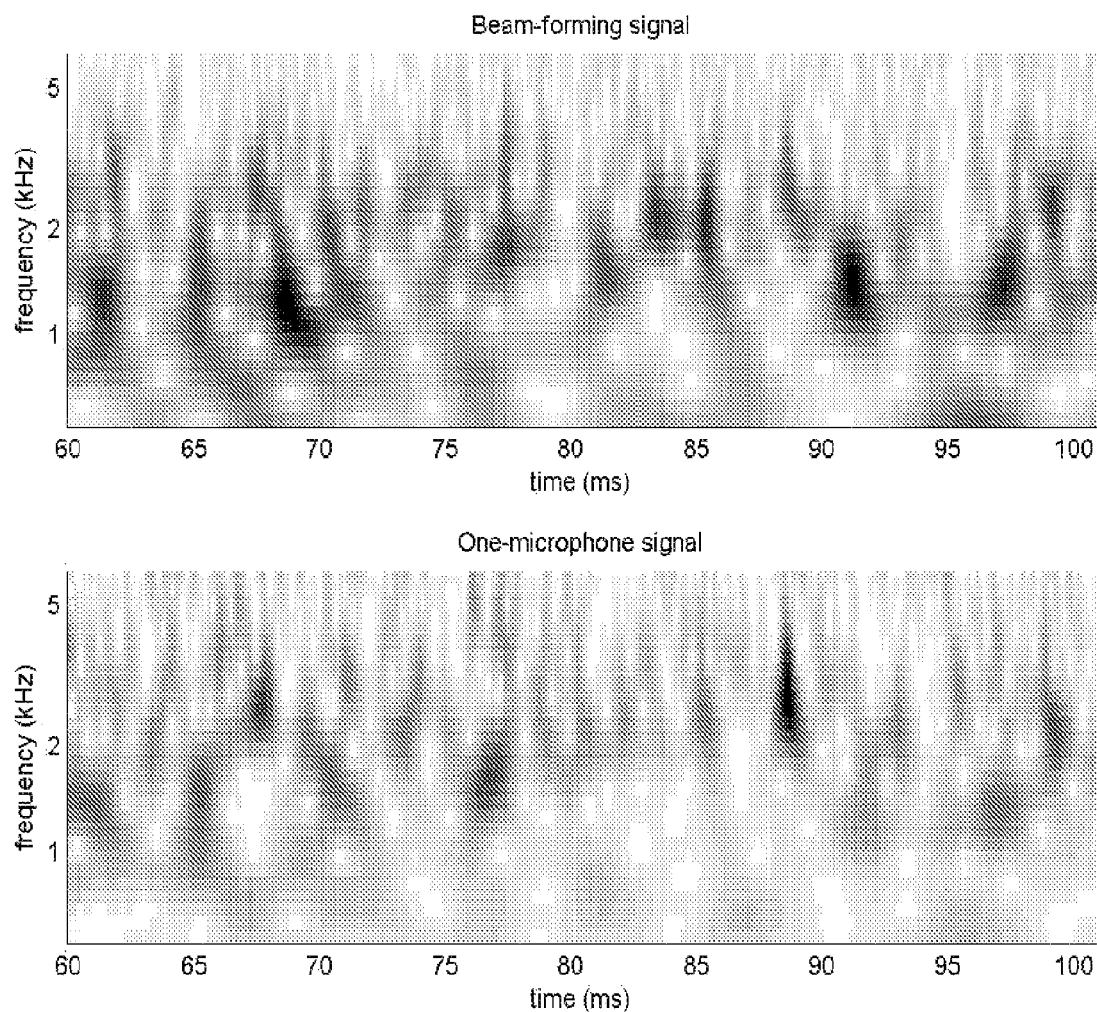
FIG. 4 is a graph comparing events in beam-formed signal and single microphone signals.

This signal (time domain) and its compensated power spectrum (Fourier frequency) are shown in FIG. 3. Non-periodic fluctuations occupy a broad band of frequencies. The brevity of the sample used here is responsible for the large fluctuations in the spectrum. The continuous wavelet transform combines features of both time and frequency representations. For this analysis, the Monet wavelet is used, i.e., a complex Fourier wave (spectral resolution) within a Gaussian envelope (temporal localization). Its magnitude is plotted, which emphasizes the envelope of fluctuations rather than the individual ups and downs within the envelope. The result is shown in FIG. 4, where dark shades correspond to large amplitude, i.e., energetic packets according to Parseval's theorem.

Figure 5:
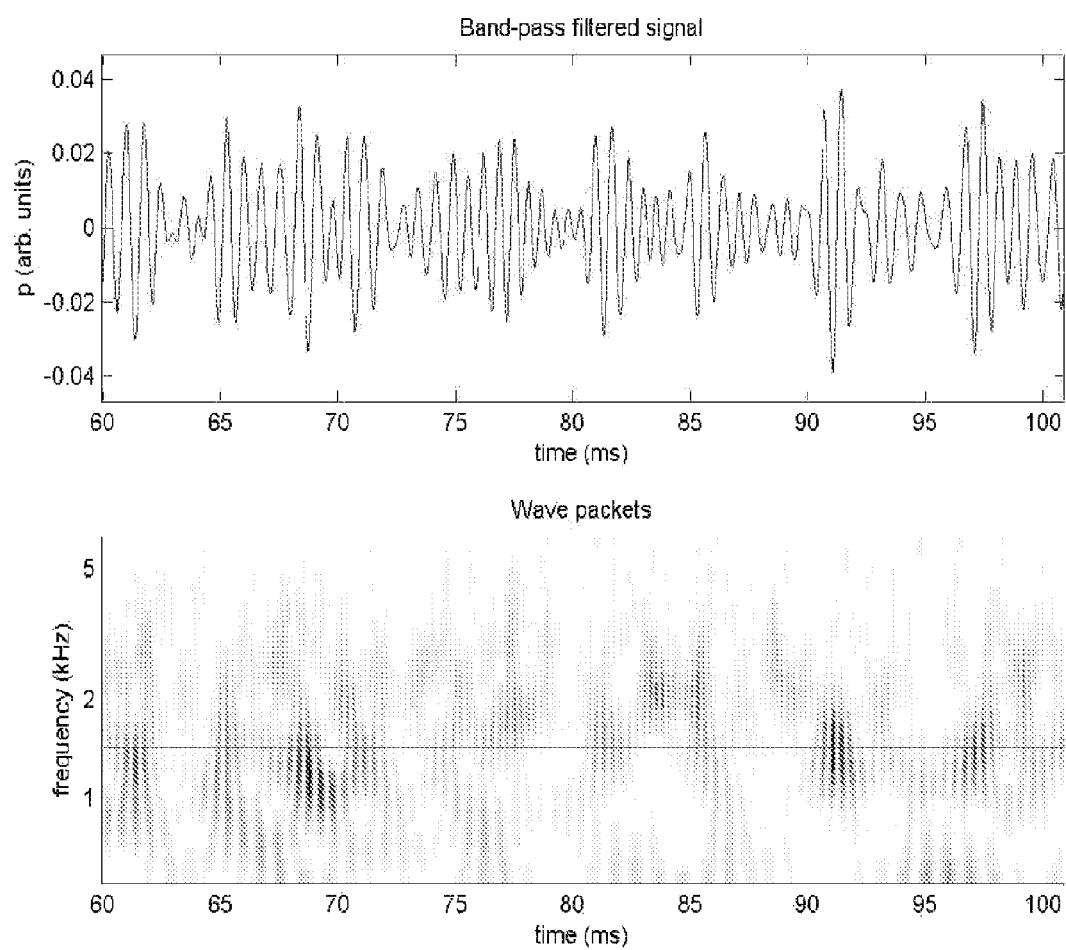
FIG. 5 is a graph of wave packets in beam-formed signals showing time-frequency distribution (bottom) and band-passed signals (top)

FIG. 5 shows the real part of the same transform with red for positive and blue for negative values. A section at 1600 Hz, as marked by the horizontal line, is also shown as a signal, which is a band-pass filtered signal. In the filtered signal, we see oscillations associated with the energy containing events of FIG. 4. Pattern recognition on these wave packets is significant to the present invention.

Figure 6:
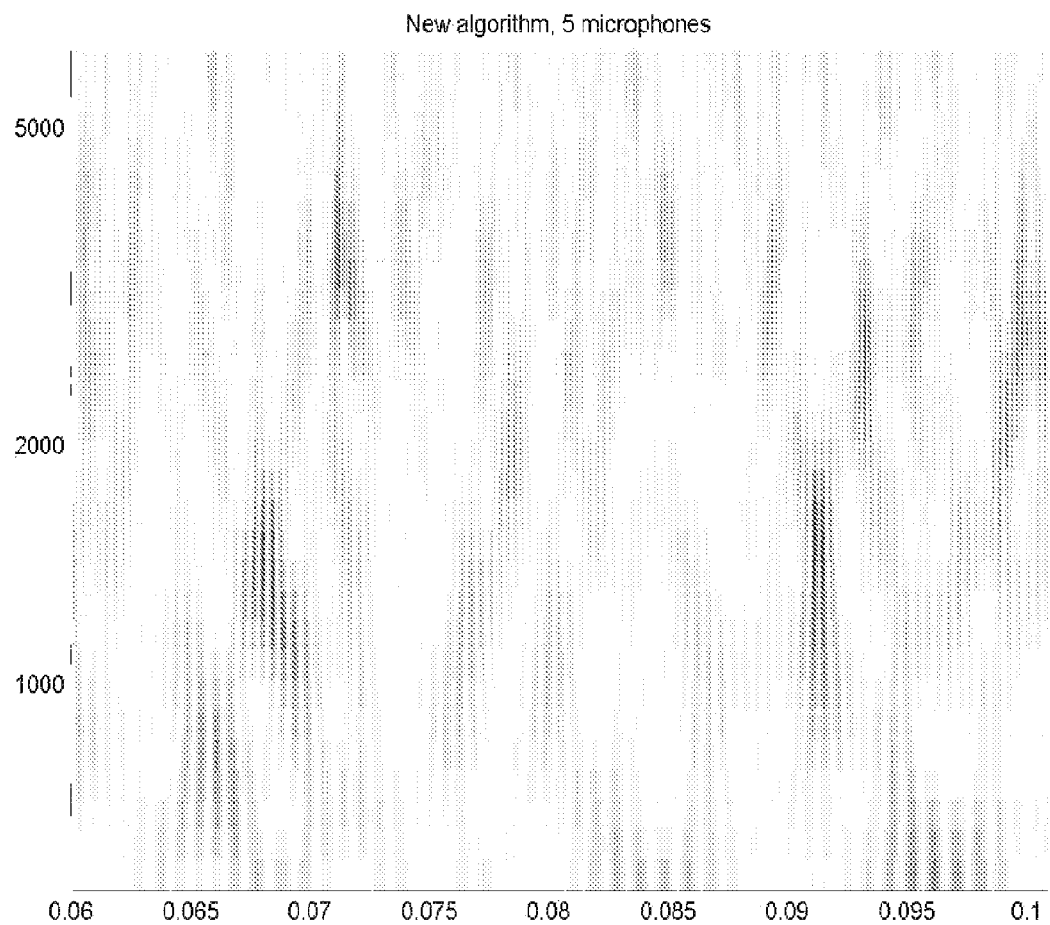
FIG. 6 is a graph showing the fringes associated with the best-matched events of FIG. 4.

The present invention thus takes the geometric average based on products rather than sums of signals. The idea, which has roots in the cross-correlation techniques, is that a single zero-crossing cancels the contributions from all signals. The signals are delayed by the lags corresponding to the target region, so that fluctuations associated with the target would be well-matched. For a perfect match, all the positive and negative fluctuations would be synchronized, and result in positive products interspersed with zero-crossings: in the time-frequency domain, they would be observed as positive vertical fringes separated by a half-period of the oscillations. As the number of microphones increases past a half-dozen, the cancellation is so effective that there is hardly any time-frequency region with non-zero contributions. Thus, the invention can calculate the product for pairs of microphones, and keep the largest (positive) contribution for each point of the time-frequency region, as seen in FIG. 6. This process selects, from the energetic events of FIG. 4, those that are best matched to the actual target. The results in FIG. 6 pool the information from only five microphones. Therefore, a dramatic reduction in hardware requirements for data acquisition is another feature of the present invention.

EXAMPLE

To illustrate the invention an analysis was performed on synthetic data. The rationale for this approach is that, in a mix of known ingredients such as wave packets and white noise, it is possible to document the agreement between the results and the prior knowledge of what they should be; and some appreciation may be gained for the effect of experimental parameters such as ambient noise, sampling rate, number of microphones and their configuration relative to the target, and others.

The improved accuracy in the localization of intermittent sources of noise relies on their identification as wave packets in the band-pass filtered signals, as shown above; on the precise measurement of the lags between pairs of signals (all pair-wise combinations of a half-dozen microphones); and on the use of these lags to locate each source by triangulation. In this section we make use of synthetic signals for study of the dependence of algorithm performance on various parameters.

The synthetic signals are realistic models of noisy events: wave packets superposed on noise. Scaling all time variables to match the frequency of the packet (i.e. using a dimensionless packet frequency, signals were constructed according to the formula $$q(t) = \exp(-(2\pi(t+\tau)/z_0)^2) \cdot \cos(2\pi(t+\tau+\phi)) + a \cdot \text{wgn}$$

where the exponential is the envelope of the packet, $z_o=5$ is a parameter that governs its scale; wgn is white Gaussian noise of zero mean and unit variance, and a is its amplitude relative to the wave packet. The lags between packets and the phase of the oscillation may be adjusted independently.

The scenario is of a source emitting a wave-packet at a time close to 0, relative to the center of an event obtained from focusing the microphone signals on a certain target and identifying a generic event. Because this event is not precisely located at the target point, its noise will reach the various microphones with small lags, positive or negative. This is modeled as uniformly distributed random number multiplying a fraction of the period of the oscillation. Similarly, the phase is generated randomly; the relative amplitude of the ambient noise is varied systematically, as described below.

Figure 7:
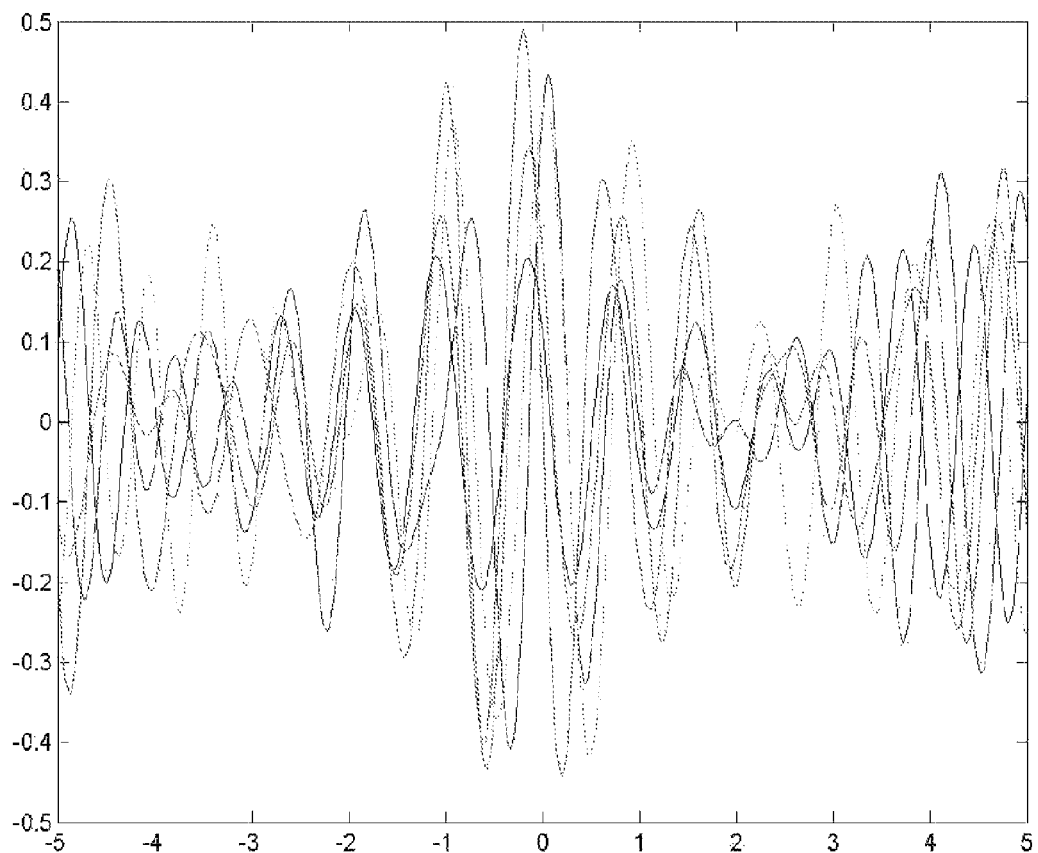
FIG. 7 is a graph of synthetic signals used for testing the effect of parameters on the accuracy of the calculation of lags according to the present invention.

The band-pass filtered signals (at unit frequency) for a set of five microphones is shown in FIG. 7. The wave packet is centered near t=0, and the (filtered) white noise amplitude is, at the packet's frequency, smaller than but comparable to the wave packet's.

Figure 8:
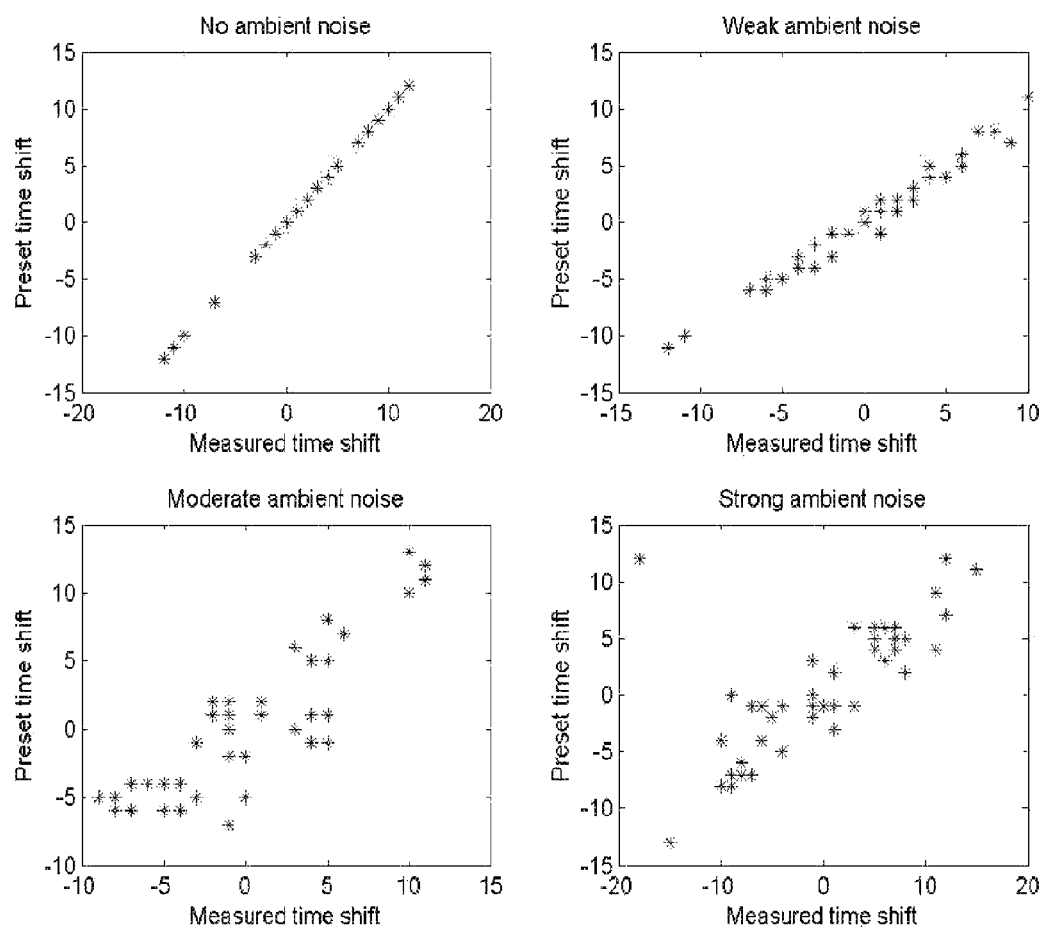
FIG. 8 is a series of graphs showing the dependence of lag accuracy on the level of ambient noise.

The lag determination algorithm (A2) starts from the identification of an event (see above) from a composite signal. From the filtered signals, a few periods (known frequency from the wavelet scalogram) are excerpted, and pair-wise cross-correlations are calculated to identify the corresponding lags. The corresponding calculations are simple vector products, with short vectors (excerpts) and the determination of the peak cross-correlation coefficient is accordingly very fast. The resulting lags are then compared to the actual lags, known by construction of the synthetic signals. The outcome for various levels of ambient noise is shown in FIG. 8.

For pure wave packets (no ambient noise), the lags are measured exactly. As the level of ambient noise increases, individual lags depart from the diagonal, but their mean (least square fit) almost exactly matches the known lags. To triangulate to a spatial location, four independent lags would be necessary, but the result would be affected by ambient noise; redundancy and least-square triangulation will improve accuracy of localization, as seen below.

The calculations above were made on the basis of 40 points per period—for a 1 kHz event, a sampling rate of 40 kHz; for 5 kHz events, a 200 kHz sampling rate would be needed to match the simulation. On this calculation, it is possible localize the events to a tenth of a period, i.e., a tenth of a wavelength. This transition from fraction of a period to a spatial scale of localization is carried out next.

The method to calculate source location from calculated lags for an ideal geometry is performed as follows. For any pair of signals, shifted according to the ideal lags corresponding to the target, the actual measured lags would all be near zero. The measured lags relate to distance from target, knowing from the above how reliably they can be measured. Taking the intended target as the origin of space and the corresponding lags for all pairs (i,j) of microphones as reference, the corrections for imperfect source location (x,y,z) will be $\text{lag}_{ij}$ (x, y, z) and are calculated in a given geometry (i=1 ... N−1, j=i+1 ... N). A multivariate Taylor series yields the linear approximation $\text{lag}_{ij}=a_{ij}x+b_{ij}y+c_{ij}z$; higher order approximations can be developed but appear unnecessary. Here, the coefficients $a_{ij}$, $b_{ij}$ and $c_{ij}$ can be pre-calculated in dimensionless form for a given microphone configuration and for a grid of points (x,y,z) surrounding the target. The least-square fit of $a_{ij}$, $b_{ij}$ and $c_{ij}$ for such a grid is the solution of the system $$a_{ij}\Sigma x^2+b_{ij}\Sigma xy+c_{ij}\Sigma xz=\Sigma x\text{lag}_{ij}$$

$$a_{ij}\Sigma xy+b_{ij}\Sigma y^2+c_{ij}\Sigma yz=\Sigma y\text{lag}_{ij}$$

$$a_{ij}\Sigma xz+b_{ij}\Sigma yz+c_{ij}\Sigma z^2=\Sigma z\text{lag}_{ij}$$

where the sums are over all grid points. The least-square fit corresponds to the correlation plane across the cloud of distorted lag measurements, as seen in FIG. 8. Then, for a set of measured Lag corresponding to a source, the corresponding vector (X,Y,Z) from target is solution of the system of equations:

$$X\Sigma a_{ij}a_{ij}+Y\Sigma a_{ij}b_{ij}+Z\Sigma a_{ij}c_{ij}=\Sigma a_{ij}\text{Lag}_{ij}$$

$$X\Sigma a_{ij}b_{ij}+Y\Sigma b_{ij}b_{ij}+Z\Sigma b_{ij}c_{ij}=\Sigma b_{ij}\text{Lag}_{ij}$$

$$X\Sigma a_{ij}c_{ij}+Y\Sigma c_{ij}b_{ij}+Z\Sigma c_{ij}c_{ij}=\Sigma c_{ij}\text{Lag}_{ij}$$

Here, the summations are over all pairs of microphones. For a fixed microphone selection, the coefficients of X, Y and Z are pre-calculated, and only the right-hand-side vector is distinct for each event.

Figure 9:
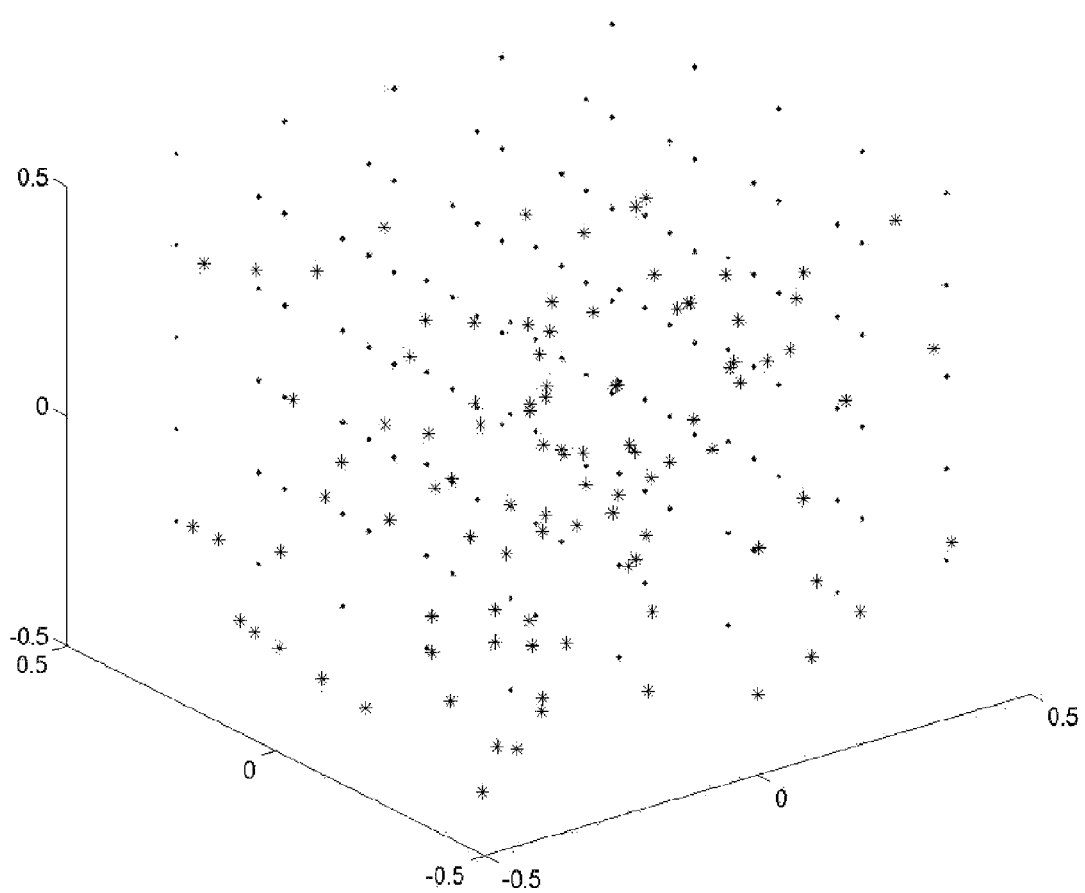
FIG. 9 is a grid of points surrounding a target and the random distribution of test sources.

The accuracy of source localization was estimated as follows. The coefficients $\text{Cli}_j$, by and cy were calculated for a cubic grid surrounding the target point and a given microphone selection. Then, would-be sources were sprinkled randomly through this volume (as seen in FIG. 9), and their lags calculated exactly from geometrical considerations. Finally, their estimated locations are compared to the known values. Representative values are that the (x,z) coordinates (parallel to the antenna) are recovered within 0:03 wavelength, with a standard deviation of 0.03; whereas the y accuracy (normal to the antenna) is only half as good with 6% standard deviation.

Calculations were repeated with perturbations in the measurements of lags, to simulate the effect of ambient noise in the experiments. Calling rms the standard deviation of all lags for the current source and microphones, rand a uniformly distributed random number over [−0.5,0.5], and C a constant, the geometrically correct lags were modified according to $$\text{lag}=\text{lag}+C\cdot rms\cdot rand$$

For C<0.5, no appreciable deterioration of the source localization was calculated, but the standard deviation in the direction normal to the antenna reached 25% of wavelength for C=2. This confirms that ambient noise will affect the quality of results, but that moderate inaccuracy in the determination of the lags in experimental data is absorbed by the least-square fit leading to the coefficients $a_{ij}$, $b_{ij}$ and $c_{ij}$.

On this basis, the Poitiers data were processed as follows: the antenna is centered in the (x-z) plane; the lags from the 31 microphones in their antenna showed that the intended target was located at coordinates (0.06,−0.92, 0) (meters); using the data from only 6 microphones (center and tips of the logarithmic arms), a short excerpt or duration 0.08 s was processed to identify individual sources near the target for each such event, the lags were accurately measured, and the most-likely location of the source was calculated; their frequency was also noted.

Figure 10:
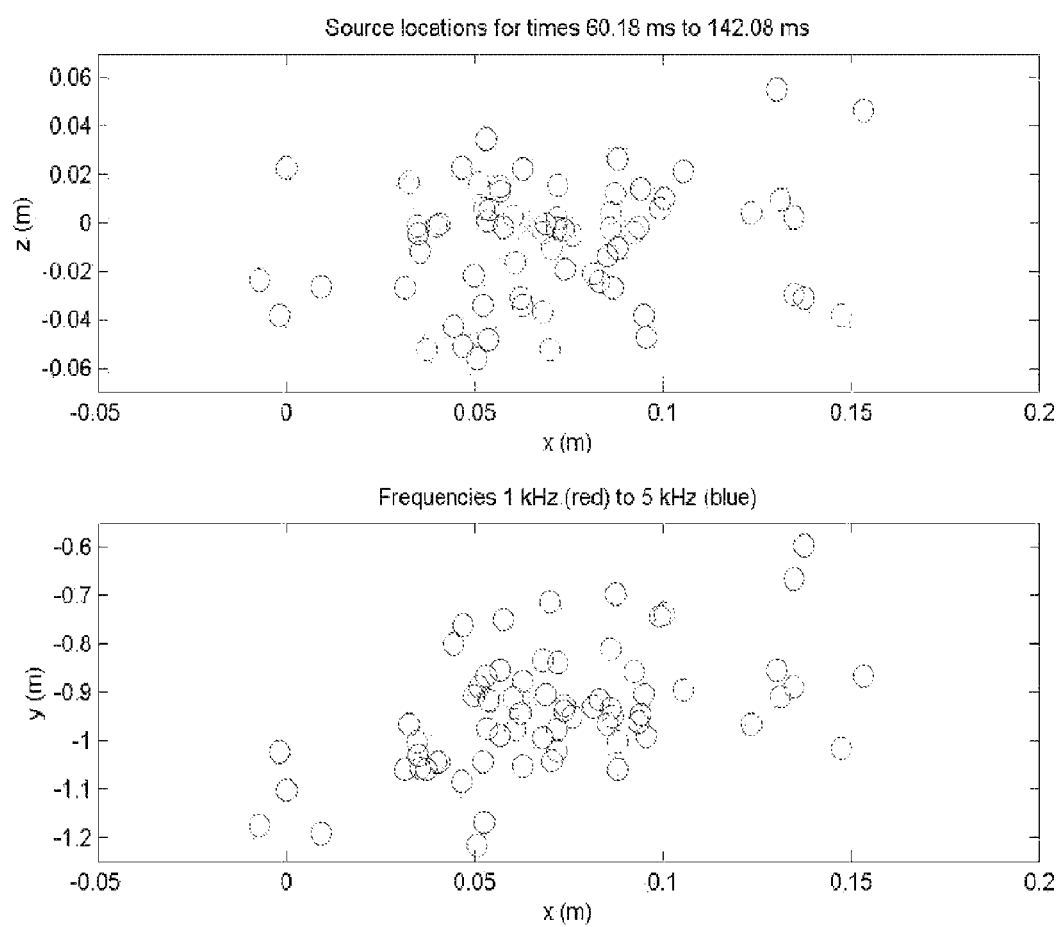
FIG. 10 is a graph of the location and frequencies of sources near a forward facing step with the target region centered on the asterisk.

The results are shown in FIG. 10. The profile of the step can be recognized in the (x,y) plot, rising about 20 cm at x=0.06 m. The sources are identified in the range of 1 to 5 kHz for these operating conditions. The large number of sources identified in the short span of 0.08 s may vary as various computational parameters are adjusted. Error bars for the locations should also be beneficial, for the accuracy in the y direction is somewhat worse than in the x and z directions.

The elevation view as seen in FIG. 10 (bottom) is particularly encouraging, as the shadow of the step remains largely free of sources, the concentration of higher-frequency sources near the edge of the step, the presence of sources near the point of separation. The sheer number of sources (only the strongest 60-odd sources are shown) detected in a short time span with random lag variations underscores the need to analyze them individually, rather than collectively as in the beam forming algorithm.

The combination of algorithms of the present invention has the capability to identify intermittent sources of noise in a canonical industrial flow. The present invention has the capability to quantify many individual source properties with accuracy in the time-frequency domain. In particular, the lags (differences in propagation times from source to microphones) enable the calculation of the location of the source with an accuracy estimated to be of the order of $\frac{1}{10}$ of a wavelength (thereby varying with frequency).

Figure 11:
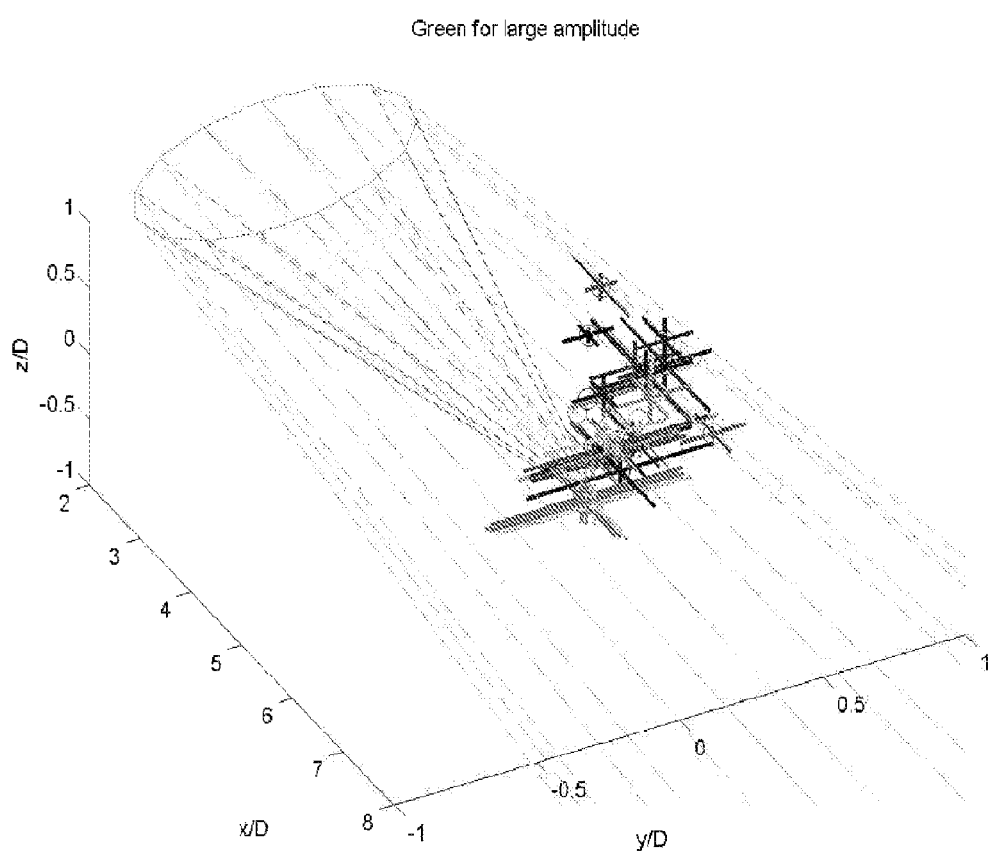
FIG. 11 is a graph of source location with error bars for sample numerical processed by the present invention.
Figure 12:
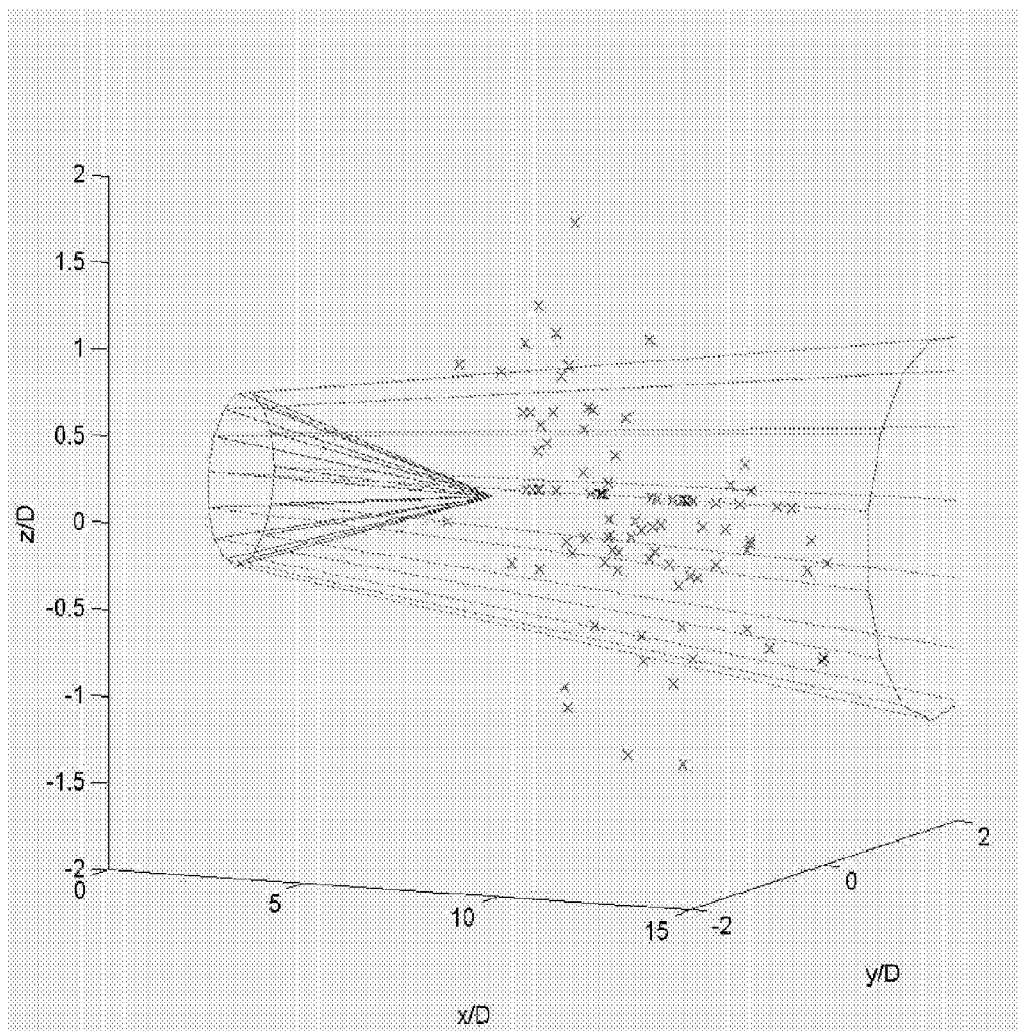
FIG. 12 is a graph of source location for sample numerical processed by the present invention.

The present invention was used with four non-coplanar microphones to determine the three-dimensional location of noise sources in high speed jets. This was done with a numerical LES database (i.e., a computer simulation of Mach 0.9 jet, where the 'microphones' were located very precisely), and more recently with experimental data at Mach 0.6. The results are seen in FIG. 11, with error bars, for the numerical data, and the source location for the experimental data is seen in FIG. 12. The lines give the schematic outline of the edge of the spreading jet and of its conical potential core; the location of sources near the tip of the potential core agrees with statistical inferences from the literature.

Figure 13:
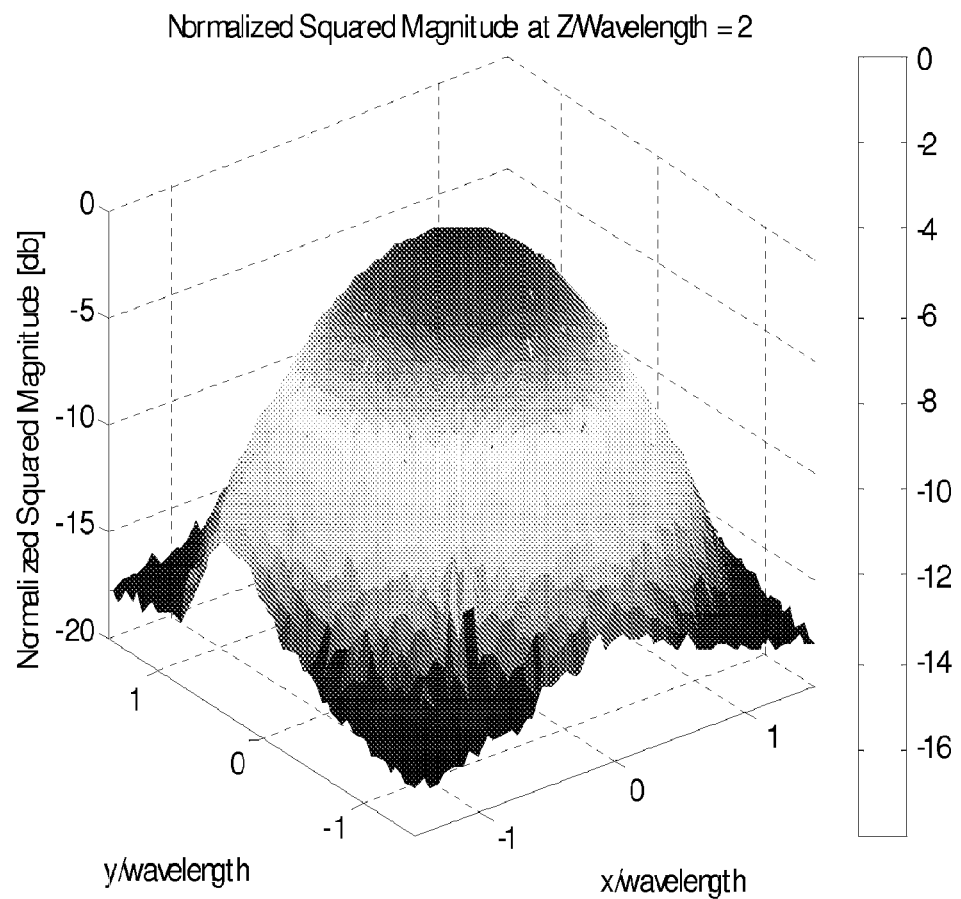
FIG. 13 is a graph of attenuation dependence on source location according to the prior art.
Figure 14:
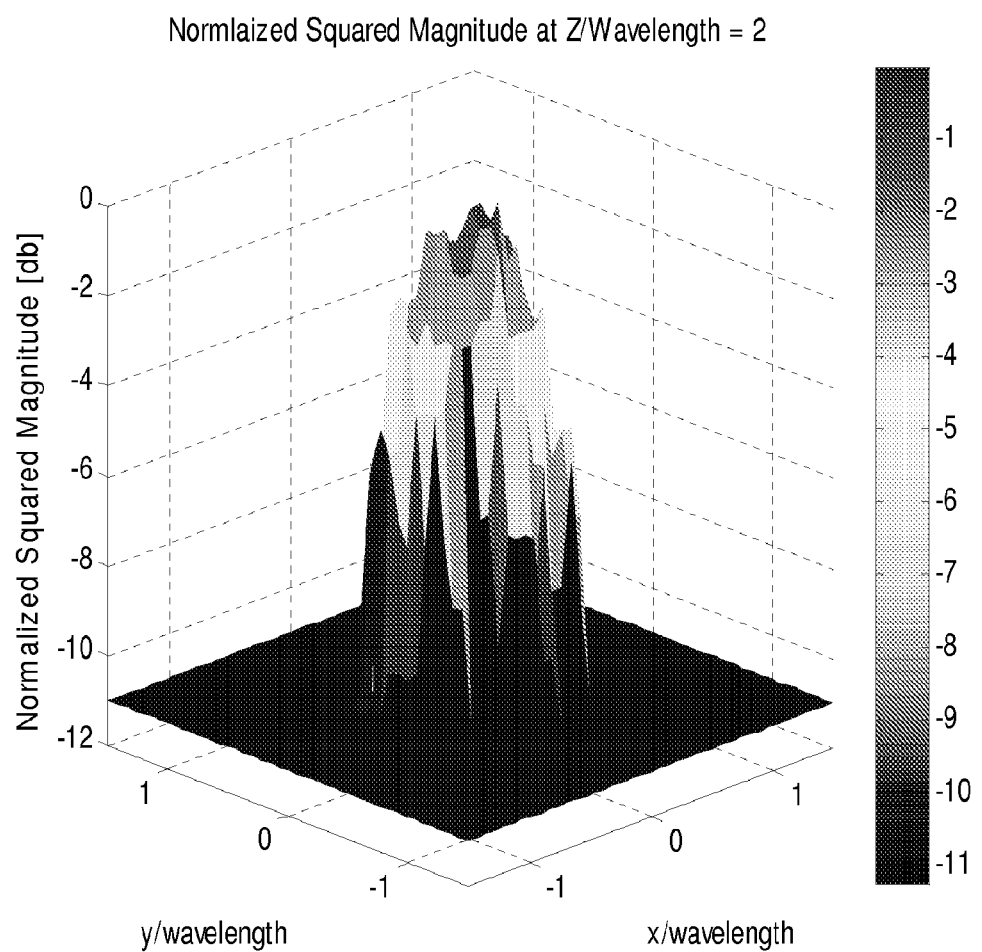
FIG. 14 is a graph of attenuation dependence on source location according to the present invention.

The improvement of the present invention over conventional approaches is illustrated in FIG. 13, which shows experimental data processed using a conventional beamforming approach, and FIG. 14, which shows the same experimental data processed using the present invention. With the source location non-dimensionalized by the source's wavelength, we see that a 2 dB attenuation with the beamforming algorithm covers approximately 1 wavelength in either direction, whereas the localization is much narrower with the present invention.

The implementation of the algorithm consists of the following steps. First, it is necessary to select an acoustic antenna comprised of at least four microphones mj (j=1 . . . 4 or more). A plane or three-dimensional configuration can be used, but no triplet of microphones should be on a straight line. The four (or more) microphones can be a subset of a conventional array and best results will be obtained if the shortest distance between microphones is not much smaller than the distance to the target. Four such microphones give three-dimensional resolution, more add redundancy and may improve accuracy.

As with a conventional antenna, the next step is to select a target (point in space), and calculate the distances $d_j$ between the target and each of the microphones; dividing by the ambient speed of sound, $t_j=d_j/c$ gives the propagation times from the source to each microphone.

Next, one can record, or process in near real-time, simultaneous acoustic signals from the microphones with a delay them to compensate for the differences in propagation times. This is similar to a conventional beam forming algorithm. It is assumed that the signals are digitized, with a sampling rate sufficient to give a fine resolution of all frequencies of interest. For example, if we want to cover frequencies up to 5 kHz, a sampling rate of 100 kHz or higher should be considered.

Next, a continuous wavelet transform is calculated for each signal. Phase resolution is important. The Mexican hat, or the real part of the Morlet transforms have been used successfully, but the norm of the Morlet wavelet is not suitable. Many band-pass filters will give similarly good results, so the procedure is not limited to the particular wavelets used here.

Figure 15A:
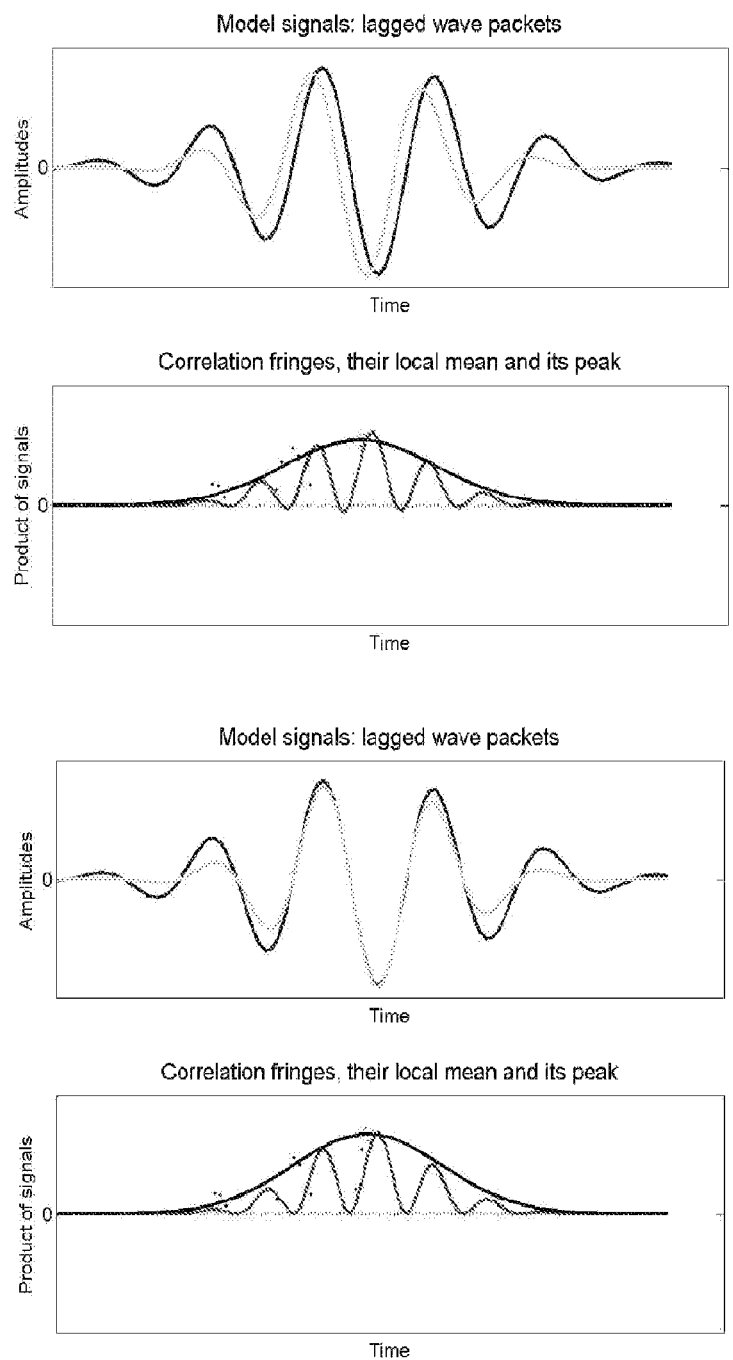
FIGS. 15A and 15B are a series of graphs illustrating noise location based on lag differences according to the present invention.
Figure 15B:
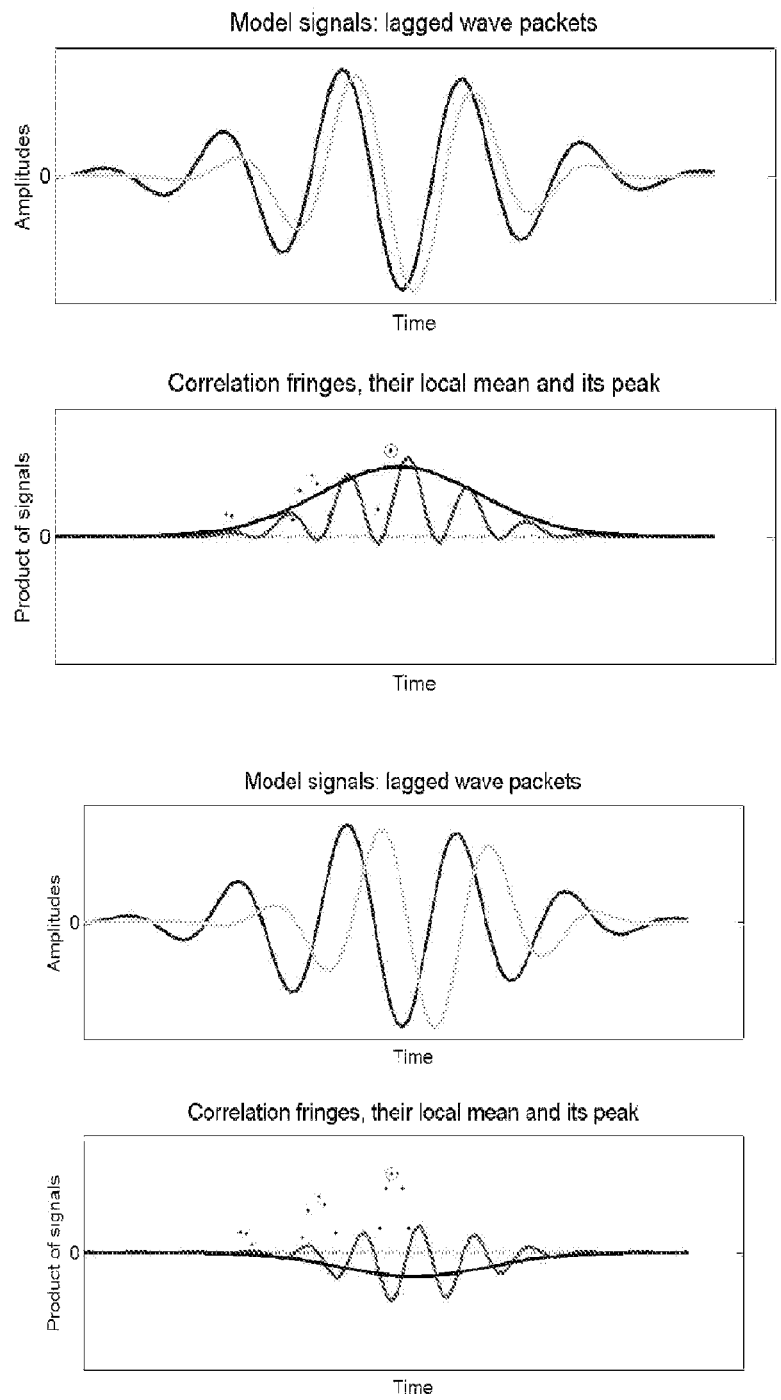

For each frequency f of interest, extract the corresponding line from the scalogram: this gives band-pass filtered signals, one for each microphone at the selected frequency. For example, signals $A_f$, $B_f$, $C_f$, etc., digitized at times $t_i$ with values $A_{fi}$, $B_{fi}$, etc. are seen in FIG. 15. In FIG. 15, four lags of model signals are used to illustrate the present invention identifying the second option (top right) as on-target. In the top frame of FIG. 15, one reference signal and its slightly distorted companion stand for band-pass filtered excerpts (same-frequency scalogram excerpts) of a single source's record at two microphones. The variable lag (sliding companion) mimics the effect of being off-target by a distance measured in wavelengths. In the bottom frame of FIG. 15, there is seen the product of the two signals, showing oscillations of frequency equal to twice the signals' frequency, and the peak value of the oscillations is largest when the lag corresponds to on-target location, as does its smoothed version, with peak values of this average marked as dots.

Changing the lag of a signal relative to a reference signal amounts to veering off target. Note that ambient noise would largely be filtered out by the wavelet transforms (band-pass filtering), so the signals are clean. The visible difference between the two signals is a realistic model of band-passed noise superposed on the actual signals.

For all independent pairs of microphones (redundancy may help accuracy), and for each frequency of interest, the direct product of the signals is calculated (for signals $A_f$ and $B_f$ the product at time $t_i$ is $P_i=A_{fi} B_{fi}$). This produces correlation fringes—similar to interference fringes, but resulting from the product instead of a summation and mapped in time rather than space. A correct lag (source at the target point) will have the band-passed signals in phase, yielding a positive value of the product at their matching maxima and minima (in time), dropping to zero at the times of sign change of A and B; if the source location veers from the target location, the product will include negative contributions, strongly reducing the local mean value of the fringes. The use of peaks (instantaneous and with local averaging) of products of band-pass filtered signals is an important difference from conventional algorithms.

Thus, for any pair of correctly lagged signals, the peak value of the product $P_i$ and of its local mean will coincide and be larger than for lags differing by one or more time steps from the ideal. The local mean (any local averaging will work, Gaussian smoothing was used for the figure) is particularly sensitive to slight departures from the correct lag.

For each pair of microphones, the correct lags yielding these extrema of $P_i$ and its local average corresponds to the source being within a surface that contains the target location; the combination of three independent pairs of microphones locates the source at the intersection of these surfaces, which corresponds to the target. A departure from target by as little as a tenth of a wavelength, or possibly finer resolution, is achievable by this method.

The above method requires the calculation of $P_i$ with multiple lags (ideal, plus or minus enough time steps to cover one period of the wave packets) for the calculation of the black curve covering several of its peaks.

In cases where ambient noise is large enough to introduce significant distortion of the wave packets, or if the wave packets include many more oscillations than considered here, the precise localization of the peaks of the red and black curves may be inaccurate. Identifying the wrong peak of the red curve will correspond to surfaces that are one-half wavelength off target. Redundancy (using more than three independent pairs of microphones) can help select the correct surface by least-squares fitting.

What is claimed is:

1. A method of localizing a noise source, comprising the steps of:
   obtaining at least four acoustic signals, each of which is provided by a separate microphone;
   selecting a target and calculating the distance from said target to each of said microphones;
   delaying each of said signals according to a propagation time delay from said target based on said distance;
   calculating a continuous wavelet transform for each of said signal to band-pass filter each of said signals according to a predetermined frequency of interest;
   determining the product of each pair of said signals to produce correlation fringes;
   calculating the local average of said fringes;
   concluding that said noise source is at said target if the peak of the average correlation occurs for zero additional delay relative to the propagation time delay.

2. The method of claim 1, wherein said step of concluding that said noise source is at said target comprises locating said noise source at said target when said product has a positive value at the matching maxima and minima of said signals.

3. The method of claim 2, wherein the distance between said microphones is equal to or larger than said distance to said target.

4. The method of claim 3, wherein the step of calculating a continuous wavelet transform for each of said signals comprises using a Mexican hat wavelet.

5. The method of claim 3, wherein the step of calculating a continuous wavelet transform for each of said signals comprises using a real or imaginary part of a Morlet transform.

6. A system for localizing a noise source, comprising:
at least four microphones, each of which is configured to output a corresponding acoustic signals, each of which is provided by a separate microphone;
a processor interconnected to each of said microphones and programmed to digitally sample said acoustic signals;
wherein said processor is programmed to calculate a propagation time based on the distance from a target to each of said microphones, to delay each of said signals according to the propagation time from said target, to calculate a continuous wavelet transform for each of said signals, to band-pass filter each of said signals according to a predetermined frequency of interest, to determine the product of each pair of said signals to produce correlation fringes for several delays larger and shorter than said delays according to the propagation time, to perform a local averaging of said correlation fringes, and to conclude that the source is at said target if the maximum of said average occurs for said delays associated with said target.

7. The system of claim 6, wherein said processor is programmed to locate said noise source based on said product of said pairs of signals by locating said noise source at said target when said product has a positive value at the matching maxima and minima of said signals.

8. The system of claim 7, wherein the distance between said microphones is equal to or larger than said distance to said target.

9. The system of claim 8, wherein said processor is programmed to calculate a continuous wavelet transform for each of said signals using a Mexican hat wavelet.

10. The system of claim 8, wherein said processor is programmed to calculate a continuous wavelet transform for each of said signals using a real or imaginary part of a Morlet transform.

\* \* \* \* \*